(12) United States Patent
Park et al.

(10) Patent No.: US 10,554,942 B2
(45) Date of Patent: Feb. 4, 2020

(54) DISPLAY APPARATUS AND RECORDING MEDIUM

(71) Applicant: SAMSUNG ELECTRONICS CO., LTD., Suwon-si, Gyeonggi-do (KR)

(72) Inventors: Seung-ho Park, Seoul (KR); Doo-seop Choi, Anyang-si (KR); Young-su Moon, Seoul (KR); Young-hoon Jeong, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 144 days.

(21) Appl. No.: 15/657,427

(22) Filed: Jul. 24, 2017

(65) Prior Publication Data

US 2018/0048875 A1 Feb. 15, 2018

(30) Foreign Application Priority Data

Aug. 12, 2016 (KR) ........................ 10-2016-0102983

(51) Int. Cl.
*G06K 9/00* (2006.01)
*H04N 9/64* (2006.01)
*H04N 13/133* (2018.01)
*H04N 13/189* (2018.01)
*H04N 9/77* (2006.01)
*H04N 13/324* (2018.01)

(52) U.S. Cl.
CPC .......... *H04N 9/646* (2013.01); *H04N 13/133* (2018.05); *H04N 13/189* (2018.05); *H04N 9/77* (2013.01); *H04N 13/324* (2018.05)

(58) Field of Classification Search
None
See application file for complete search history.

(56) References Cited

U.S. PATENT DOCUMENTS

| | | | |
|---|---|---|---|
| 2002/0089842 A1* | 7/2002 | Santosuosso | A47F 3/001 362/92 |
| 2003/0147053 A1* | 8/2003 | Matsuda | G09G 1/285 353/31 |
| 2006/0158458 A1* | 7/2006 | Kojima | G09G 3/3233 345/592 |
| 2010/0053051 A1* | 3/2010 | Nitanda | G09G 3/2003 345/89 |
| 2010/0231602 A1* | 9/2010 | Huang | G09G 3/3406 345/589 |
| 2012/0050074 A1* | 3/2012 | Bechtel | B60R 1/04 340/988 |
| 2018/0012561 A1* | 1/2018 | Yoon | G09G 5/10 |

FOREIGN PATENT DOCUMENTS

KR 10-2014-0083741 7/2014

* cited by examiner

*Primary Examiner* — Hadi Akhavannik
(74) *Attorney, Agent, or Firm* — Nixon & Vanderhye P.C.

(57) ABSTRACT

The present disclosure provides a display apparatus including: a display; a signal receiver configured to receive an image signal; a signal processor configured to process the image signal received in the signal receiver; a first sensor configured to sense ambient brightness; and a controller configured to control the signal processor to change grayscale of an output image to be displayed on the display based on characteristics of the image signal and characteristics of the display apparatus if a glare level corresponding to the ambient brightness sensed by the first sensor and brightness of the display is greater than a preset threshold.

14 Claims, 8 Drawing Sheets

DISPLAY APPARATUS AND RECORDING MEDIUM

CROSS-REFERENCE TO RELATED APPLICATION

This application is based on and claims priority under 35 U.S.C. § 119 to Korean Patent Application No. 10-2016-0102983 filed on Aug. 12, 2016 in the Korean Intellectual Property Office, the disclosure of which is incorporated by reference herein in its entirety.

BACKGROUND

Field

The present disclosure relates generally to a display apparatus, which processes a content signal and displays a content image, and a recording medium, and for example to a display apparatus, which has an improved structure for preventing and/or reducing a decrease in contrast of a content image while reducing glare recognizable by a user viewing the content image, and a recording medium.

Description of Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus receives a content signal including video data from the exterior and processes the video data extracted from the content signal in accordance with various image processing processes. The image processing apparatus may display an image based on the processed video data on its own display panel, or output the processed video data to another display apparatus provided with a display panel so that the corresponding display apparatus can display an image based on the processed image signal. As a representative of the image processing apparatus that has no display panel, there is a set-top box. The image processing apparatus that has a display panel is called a display apparatus, and may for example includes a TV, a monitor, a portable multimedia player (PMP), a tablet computer, a mobile phone, etc.

With development in performance of the display apparatus, manufacturers of the display apparatus have launched a display apparatus with a display panel having a relatively high maximum brightness. In a conventional display apparatus, the display panel has a maximum brightness of several hundred nits. However, in a display apparatus released or proposed in recent times, the display panel has a maximum brightness of several thousand nits. As the maximum brightness of the display panel increases, some problems may arise in use. As an example of such problems, a user may visually feel glare while viewing a content image displayed on the display apparatus.

A conventional display apparatus decreases the brightness of the image displayed on the display panel if a condition where a user is expected to feel the glare is satisfied. In this way, the quantity of light emitted from the display panel decreases, and thus the glare a user feels reduced. However, if the quantity of light emitted from the display panel decreases, contrast of a displayed image is also decreased. In result, the display apparatus shows an image of low quality to a user. Accordingly, the display apparatus has to make a user feel less glare with minimum decrease of contrast while displaying a content image.

SUMMARY

According to an example aspect of the present disclosure, a display apparatus is provided, the display apparatus including: a display; a signal receiver configured to receive an image signal; a signal processor configured to process the image signal received in the signal receiver; a first sensor configured to sense ambient brightness; and a controller configured to control the signal processor to change grayscale of an output image to be displayed on the display based on characteristics of the image signal and characteristics of the display apparatus if a glare level corresponding to the ambient brightness sensed by the first sensor and brightness of the display is greater than a preset threshold. Thus, the display apparatus can minimize and/or reduce contrast decrease of an image while preventing and/or reducing the glare from occurring.

The controller may adjust a rate of change for the grayscale of the output image to a high grayscale range of the input image to be different from a rate of change for the grayscale of the output image to a low grayscale range of the input image.

The controller may adjust the rate of change for the grayscale of the output image to the high grayscale range of the input image to be higher than the rate of change for the grayscale of the output image to the low grayscale range of the input image. Thus, the display apparatus can provide vivid contrast under a condition that the brightness of the output image is generally lowered.

The controller may determine a grayscale value for distinguishing between a high grayscale range and a low grayscale range within the input image based on distribution of the grayscale values of the input image. Thus, the display apparatus can easily distinguish between the high grayscale range and the low grayscale range in the image.

The controller may adjust an upper limit of a grayscale value of the output image to be in inverse proportion to a percentage of an area occupied by a high grayscale range between the high grayscale range and a low grayscale range of the input image.

The controller may adjust an upper limit of a grayscale value of the output image to be in proportion to a pixel pitch of the display.

The glare level may be in proportion to difference between the ambient brightness and the brightness of the display.

The display apparatus may further include a second sensor configured to sense a position of a user, wherein the glare level may be in inverse proportion to a distance between the display and a user sensed by the second sensor and in proportion to the size of the display.

A recording medium storing a program code which, when executed by a processor of a display apparatus, causes the display apparatus to perform at least one operation including: receiving an image signal for an input image; determining whether a glare level corresponding to ambient brightness and brightness of a display of the display apparatus is greater than a preset threshold; changing grayscale of an output image based on characteristics of the image signal and characteristics of the display apparatus if the glare level is greater than the threshold; and displaying the output image having the changed grayscale on the display.

The changing the grayscale of the output image may include adjusting a rate of change for the grayscale of the output image to a high grayscale range of the input image to be different from a rate of change for the grayscale of the output image to a low grayscale range of the input image.

The rate of change for the grayscale of the output image to the high grayscale range of the input image may be adjusted to be higher than the rate of change for the grayscale of the output image to the low grayscale range of the input image.

The changing the grayscale of the output image may include determining a grayscale value for distinguishing between a high grayscale range and a low grayscale range within the input image based on distribution of the grayscale values of the input image.

The changing the grayscale of the output image may include adjusting an upper limit of a grayscale value of the output image to be in inverse proportion to a percentage of an area occupied by a high grayscale range between the high grayscale range and a low grayscale range of the input image.

The changing the grayscale of the output image may include adjusting an upper limit of a grayscale value of the output image to be in proportion to a pixel pitch of the display.

The glare level may be in proportion to difference between the ambient brightness and the brightness of the display.

The glare level may be in inverse proportion to a distance between the display and a user and in proportion to the size of the display.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Below, various example embodiments will be described in detail with reference to accompanying drawings. The following descriptions of the example embodiments are made by referring to elements shown in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Figure 1:
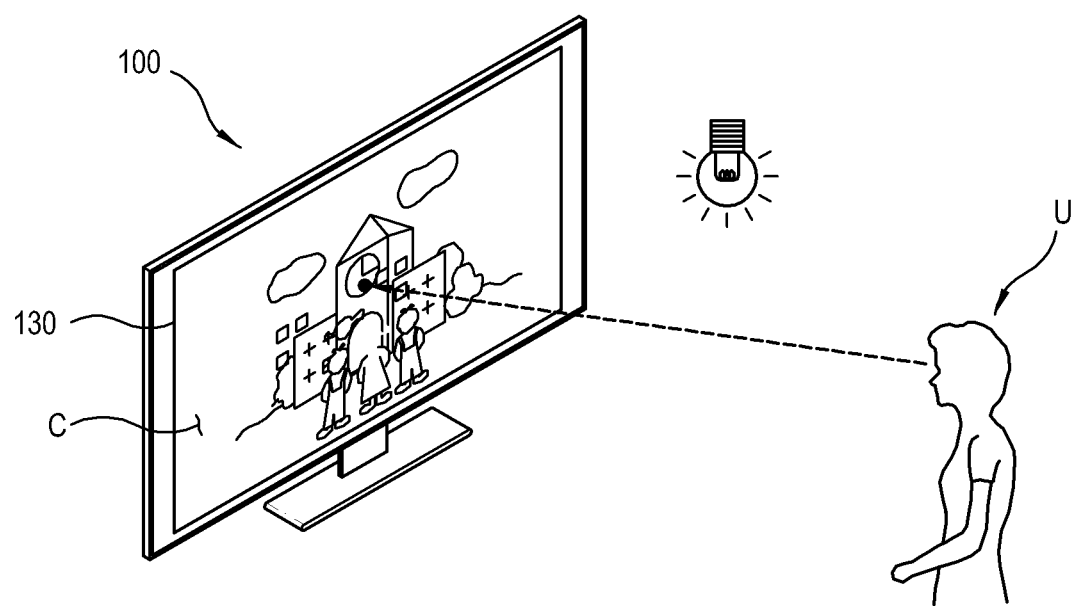
FIG. 1 is a diagram illustrating an example in which a display apparatus according to an example embodiment displays an image under a predetermined usage environment.

FIG. 1 is a diagram illustrating an example in which a display apparatus 100 according to an example embodiment displays an image C under a predetermined usage environment.

As illustrated in FIG. 1, the display apparatus 100 in this example embodiment processes a content signal to be displayed as a content image C on a display panel 130.

To display the content image C, the display apparatus 100 schematically performs the following processes. The display apparatus 100 de-multiplexes a content signal to extract a video signal from signal components of the content signal. The display apparatus 100 decodes a video signal. In the video signal, a certain video frame has grayscale values of respective pixels. The display apparatus 100 uses a tone mapping method to adjust the grayscale value of each pixel in the video frame in accordance with characteristics of the display panel 130. As an example of the characteristics of the display panel 130, there is the maximum brightness of the display panel 130. The display apparatus 100 displays a video frame on the display panel 130 with brightness corresponding to the adjusted grayscale values of the pixels. These processes are performed in sequence with regard to each video frame, so that the display apparatus 100 can display the content image C on the display panel 130.

The tone mapping method refers to a technique of mapping the grayscale value of each pixel in an input video frame with a brightness range representable on the display panel 130. For example, if a video frame of a high dynamic range (HDR) is desired to be displayed on the display panel 130 of supporting a low dynamic range (LDR), the display apparatus 100 keeps an enough range in a low grayscale range of the video frame but restricts the range as the video frame gets closer to the high grayscale range. There may be various ways of how to use the tone mapping method.

The maximum brightness of the display panel 130 may be varied depending on products or models. The maximum brightness of the display panel 130 to be applied to the display apparatus 100 may be determined according to many factors. For example, the maximum brightness required in the display panel 130 may be determined based on a usage environment of the display apparatus 100. The display apparatus 100 generally used in an indoor environment like a television (TV) includes the display panel 130 having the maximum brightness of less than 1000 nit, e.g., about several hundred nits. Here, nit refers to brightness of a surface having luminous intensity of 1 $cd/m^2$. On the other hand, the display apparatus generally used in an outdoor environment like a digital signage may need the display panel 130 having the maximum brightness of more than 2000 nit.

By the way, if the maximum brightness of the display panel 130 has a relatively high level of several thousand nits, a user U may feel glare while viewing the content image C. For example, a user U may feel the glare in accordance with the ambient brightness of the display apparatus, a distance from the display panel 130 to the user U, etc. if an effective average brightness level of a video frame being displayed on the display panel 130 is high.

Under a usual condition where the glare does not occur, the display apparatus according to an example embodiment converts grayscale values of an input image into grayscale values of an output image by the tone mapping method, and displays the output image on the display panel in accordance with the converted grayscale values of the output image. On the other hand, if it is determined that the glare occurs, the display apparatus adjusts settings of the tone mapping method in consideration of the characteristics of the input image and the characteristics of the display apparatus, and applies the adjusted tone mapping method to the conversion for the grayscale values of the input image, thereby changing the grayscale of the output image.

The glare may be schematically expressed in the form of a ratio of brightness of an image displayed on the display apparatus 100 to the ambient brightness of the display apparatus 100. The larger the difference between the brightness of the displayed image and the ambient brightness is, the more noticeable the glare a user feels is. For example, if the ambient brightness is E, the brightness of the displayed image is L and a preset first threshold for determining the glare is Th1, the glare is expressed in the form of (L/E). If (L/E)≤Th1, it is determined that the glare does not occur. If (L/E)>Th1, it is determined that the glare occurs 1.

The first threshold refers to a comparison value for glare recognition levels, which is used as a criterion for determining whether the glare occurs. For example, the glare recognition levels may be calculated as values from '0' to '10', and the glare recognition level higher than '6' may show that the glare occurs. In this case, the level of '6' is used as the threshold for determining whether the glare occurs.

If the display apparatus changes the grayscale of the output image to decrease the effective average brightness level of the output image, the value of 'L' in (L/E) is lowered. If the value of 'L' is lowered to make (L/E)>Th1 into (L/E)≤Th1, it means that the problem of the glare is solved.

Here, the display apparatus 100 makes the grayscale of the output image for lowering the effective average brightness level of the output image be not just linearly but nonlinearly, e.g., generally inconstantly changed with respect to a specific grayscale value of the input image. That is, the display apparatus 100 adjusts a rate of change for the grayscale value of the output image to the high grayscale range of the input image to be different from a rate of change for the grayscale value of the output image to the low grayscale range of the input image. Division in between the high grayscale range and the low grayscale range will be described later.

Thus, the display apparatus 100 can minimize and/or reduce contrast decrease of an image while preventing the glare from occurring.

Below, the structure and functions of the display apparatus 100 will be described.

Figure 2:
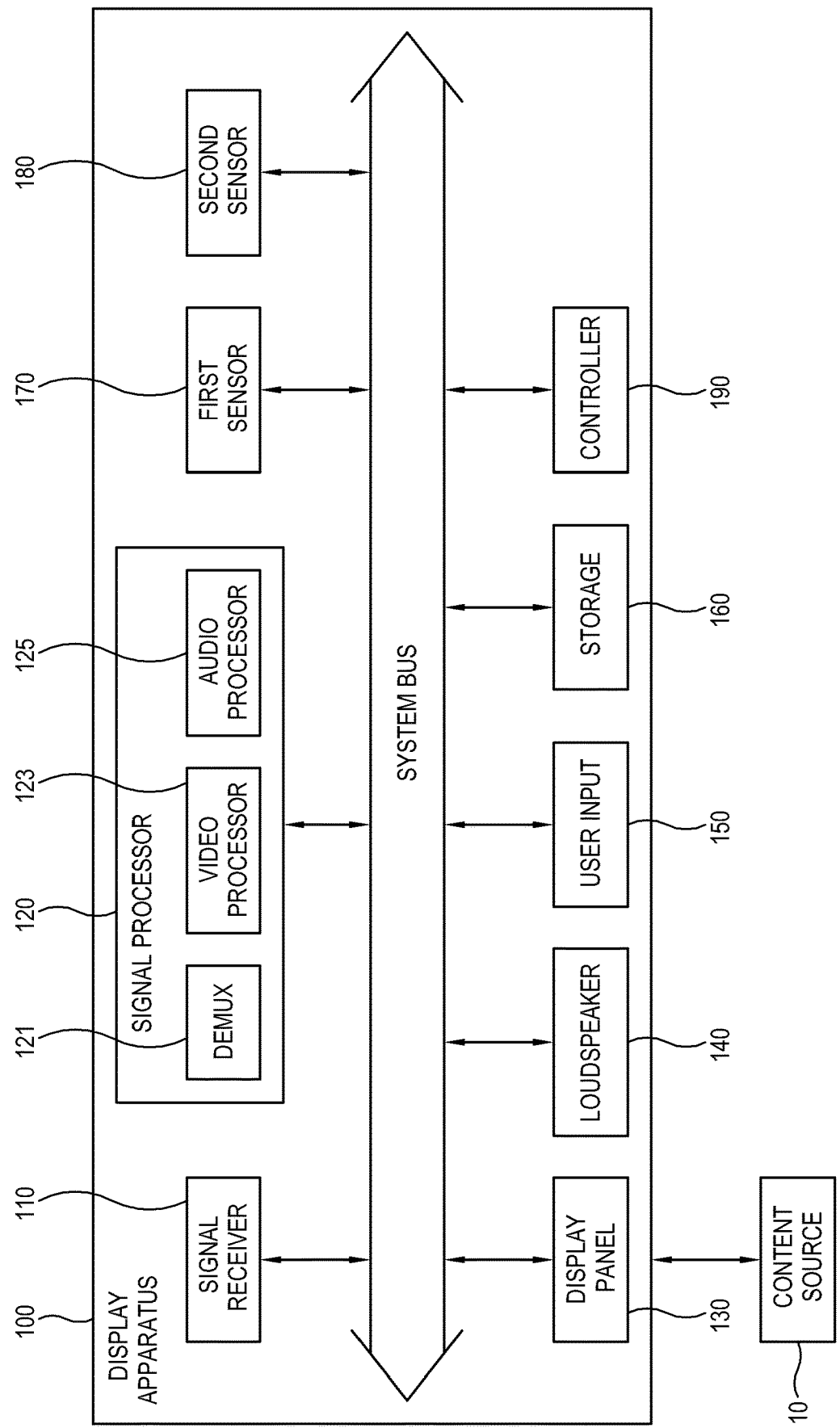
FIG. 2 is a block diagram illustrating an example display apparatus according to an example embodiment.

FIG. 2 is a block diagram illustrating an example of the display apparatus 100 according to an example embodiment.

As illustrated in FIG. 2, the display apparatus 100 according to an example embodiment receives a content signal from various content sources 10. In this example embodiment, the display apparatus 100 is achieved by a TV, but this is not the only one example where the present concept may be realized. Alternatively, the present concept may be applied to various kinds of apparatus that can process a content signal and display a content image, such as a tablet computer, a personal computer, a mobile phone, a wearable device, etc.

The display apparatus 100 includes a signal receiver 110 for receiving a content signal from the content source 10, a signal processor (e.g., including processing circuitry) 120 for processing the content signal received through the signal receiver 110, a display panel 130 for displaying a content image based on the content signal processed by the signal processor 120, a loudspeaker 140 for outputting a content sound based on the content signal processed by the signal processor 120, a user input (e.g., including input circuitry) 150 for receiving a user's input, a storage 160 for storing data, a first sensor 170 for sensing ambient brightness, a second sensor 180 for sensing a predetermined object at the exterior, and a controller (e.g., including processing circuitry) 190 for performing calculations for the process of the signal processor 120 and control for general operations of the display apparatus 100. These elements are connected to one another through a system bus.

The signal receiver 110 includes a communication module comprising communication circuitry for receiving a content signal from the content source 10 and the like external apparatuses. The signal receiver 110 is an element for basically receiving a signal or data from the exterior, but not limited thereto. Alternatively, the signal receiver 110 may be used for interactive communication. For example, the signal receiver 110 may include various signal receiving circuitry, such as, for example, and without limitation, a tuning chip to be tuned to a frequency designated for a radio frequency (RF) broadcast signal, an Ethernet module to receive packet data from the Internet by a wire, a wireless communication module to wirelessly receive packet data, a connection port to which a universal serial bus (USB) memory and the like external memory is connected, etc. That is, the signal receiver 110 includes a data input interface where communication modules or ports respectively corresponding to various kinds of communication protocols are combined.

The signal processor 120 may include various signal processing circuitry that performs various processes with respect to a content signal received in the signal receiver 110 so that content can be reproduced. The signal processor 120 may include various circuitry, such as, for example, and without limitation, a hardware processor realized by a chipset, a buffer, a circuit and the like mounted to a printed circuit board, and may be designed as a system on chip (SoC) as necessary. Fundamentally, the signal processor 120 processes a content signal so that a content image can be displayed on the display panel 130 and a content sound can be output through the loudspeaker 140.

The signal processor 120 may include various circuitry, such as, for example, and without limitation, a demultiplexer (DEMUX) 121 for de-multiplexing a content signal into a video signal and an audio signal, a video processor 123 for processing the video signal output from the DEMUX 121 by a video processing process so that the content image can be displayed on the display panel 130, and an audio processor 125 for processing the audio signal output from the DEMUX 121 by an audio processing process so that the content sound can be output from the loudspeaker 140.

The DEMUX 121 divides the packets of the multiplexed content signal in accordance with PID, thereby de-multiplexing the content signal into sub signals such as a video signal, an audio signal, an appendix data signal, etc. The DEMUX 121 outputs the video signal among the sub signals to the video processor 123, and outputs the audio signal to the audio processor 125. However, the content signal does not have to be always divided by the DEMUX 121. If the content signal is provided to the display apparatus 100 as it is divided into the video signal and the audio signal, the de-multiplexing process of the DEMUX 121 may be not required.

The video processor 123 may be achieved by a hardware processor chip, and performs the video processing process such as decoding, image enhancement, scaling, etc. with regard to a video signal, thereby outputting the processed video signal to the display panel 130. As necessary, the video processor 123 may be achieved by combination of a plurality of processor chips.

The audio processor 125 may be achieved by a hardware digital signal processor (DSP), and performs the audio processing process such as channel division, amplification, volume control, etc. with regard to an audio signal, thereby outputting the processed audio signal to the loudspeaker 140. If the loudspeaker 140 includes a plurality of unit loudspeakers, the audio processor 125 divides and processes the audio signal according to channels, and respectively outputs the processed signals to the unit loudspeakers according to the channels.

The display panel 130 displays an image based on a video signal processed by the video processor 123. There are no limits to the type of the display panel 130, and the display panel 130 may have a light receiving structure such as a liquid crystal display (LCD) panel, or a self-emissive structure such as an organic light emitting diode (OLED), or the like, but is not limited thereto. Further, the display panel 130 may additionally include an additional structure according to types. For example, if the display panel 130 is an LCD panel, the display panel 130 includes a backlight unit for emitting light, and a panel driving substrate for driving the display panel 130, etc.

The loudspeaker 140 outputs a sound based on audio data processed by the signal processor 120. The loudspeaker 140 includes a unit loudspeaker corresponding to audio data of one audio channel. For example, if audio data is of a plurality of audio channels, the loudspeaker 140 includes the plurality of unit loudspeakers corresponding to the audio data.

The user input 150 may include various input circuitry that transmits various preset control command or information to the controller 190 in response to a user's control or input. That is, the user input 150 sends the signal processor 120 various events caused by a user's control corresponding to a user's intention, so that the controller 190 can operate corresponding to the event.

The user input 150 may be variously achieved in accordance with information input methods. For example, the user input 150 may include user interface environments installed in the display apparatus 100, including various input circuitry, such as, for example, and without limitation, a key provided in an outer side of the display apparatus 100, a touch screen provided in the display panel 130, a microphone for receiving a user's voice, a camera or sensor for photographing or sensing a user's gesture or the like, etc. A remote controller may be an example of the user interface environments. The remote controller is separately provided from a main body of the display apparatus 100, and therefore transmits a control signal to the display apparatus 100 through a separate control signal receiver provided in the main body of the display apparatus 100.

The storage 160 stores various pieces of data under the processes of the signal processor 120 and the control of the controller 190. The storage 160 is accessed by the signal processor 120 and the controller 190 so that the data can be read, written, modified, updated and so on. The storage 160 includes a nonvolatile memory such as a flash memory, a hard disc drive (HDD), a solid state drive (SSD) and the like to retain data regardless of whether the display apparatus 100 is powered on or off; and a volatile memory such as a buffer, a random access memory (RAM) and the like to which data to be processed by the signal processor 120 is temporarily loaded.

The first sensor 170 senses the ambient brightness of the display apparatus 100, and outputs information obtained by digitizing the sensed brightness. Based on the information output from the first sensor 170, it is possible to quantitatively determine the current ambient light of the display apparatus 100. The first sensor 170 may be achieved in various forms such as an illuminometer, a photo-sensor, etc. As necessary, the first sensor 170 may be designed as an independent device and thus separated from the display apparatus 100. In this case, the information is transmitted from the first sensor 170 to the display apparatus 100 by a wire or wirelessly.

The second sensor 180 senses where or where a predetermined object is positioned or moves around the display apparatus 100. For example, the second sensor 180 may sense a user's relative position and distance from the display apparatus 100. To this end, the second sensor 180 may be achieved by a camera, an ultrasonic sensor, etc.

In this example embodiment, the first sensor 170 and the second sensor 180 are all provided as the elements of the display apparatus 100, but not limited thereto. Alternatively, at least one of the first sensor 170 and the second sensor 180 may be provided as a device separated from the display apparatus 100, and transmit the sensed information to the display apparatus 100. That is, the display apparatus 100 may not include the first sensor 170 or the second sensor 180 but receive information about the ambient brightness, information about a user's position, etc. from the exterior.

The controller 190 may include various processing circuitry, such as, for example, and without limitation, a dedicated processor, a central processing unit (CPU), a microprocessor, etc. and thus controls operations of elements such as the signal processor 120 in the display apparatus 100.

Below, the processes of the display apparatus 100 according to an example embodiment for applying tone mapping to an input image will be described.

Figure 3:
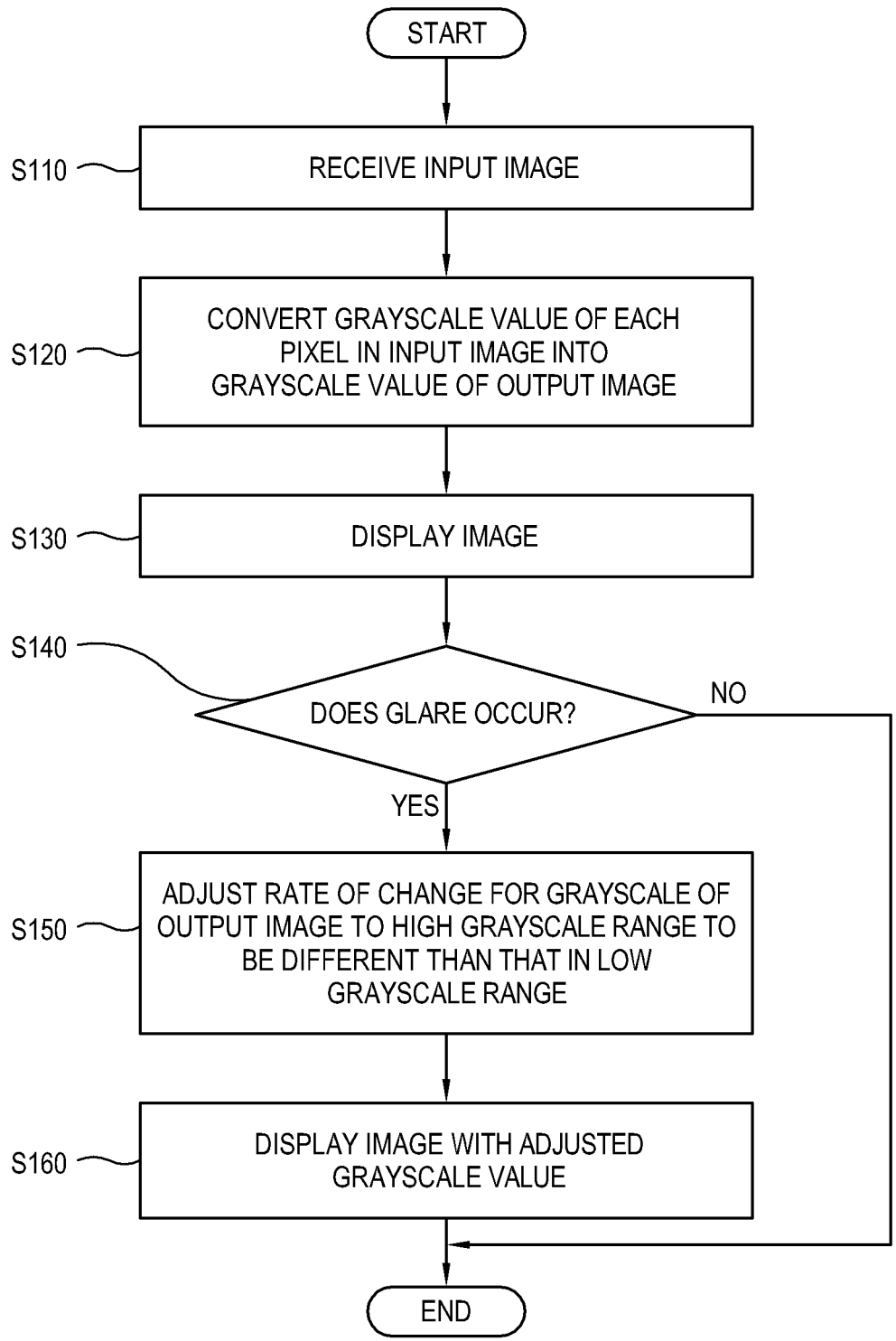
FIG. 3 is a flowchart illustrating an example method of controlling the display apparatus according to an example embodiment.

FIG. 3 is a flowchart illustrating an example method of controlling the display apparatus according to an example embodiment.

As illustrated in FIG. 3, at operation S110 the display apparatus receives an input image. The input image refers to a video signal extracted from a content signal, and an output image refers to an image finally displayed on the display panel.

At operation S120 the display apparatus converts grayscale values of respective pixels in the input image into grayscale values for the output image based on a preset tone mapping algorithm. For example, the display apparatus adjusts a grayscale value of one pixel in an input image into a first value suitable for the display panel in accordance with a preset tone mapping curve.

At operation S130 the display apparatus displays the output image based on the converted grayscale value.

At operation S140 the display apparatus senses or determines whether the glare occurs or not. The criterion for determining this determination is provided by putting together various parameters such as an average grayscale value of the input image, grayscale distribution of the input image, ambient brightness, the size of the display panel relative to a user, etc.

If it is determined that the glare does not occurs, the display apparatus does not adjust the tone mapping curve. On the other hand, if it is determined that the glare occurs, the display apparatus adjusts the preset tone mapping curve in accordance with the following processes.

When the glare occurs, the display apparatus calculates a grayscale value for distinguishing between a low grayscale range and a high grayscale range from the input image. In this example embodiment, such a grayscale value refers to a reference grayscale value for convenience of description. To calculate (determine) the reference grayscale value, various algorithms may be used. Details of various algorithms will be described later.

The display apparatus decreases the grayscale value of the output image corresponding to each grayscale value of the input image in response to the glare occurrence, so that the effective average brightness level of the output image can be lowered by a preset value as compared with the effective average brightness level of no glare. That is, the display apparatus determines the grayscale value of the output image corresponding to the grayscale value of one pixel in the input image as not a default value, e.g., the first value but a second value lower than the first value. Since the effective average brightness level is lowered than an original level, it is possible to solve the problem of the glare a user feels. However, the lowered effective average brightness level may decrease the contrast of the overall output image.

Therefore, at operation S150 the display apparatus adjusts a rate of change for the grayscale of the output image in the high grayscale range of the input image to be different from that in the low grayscale range of the input image. Specifically, the display apparatus adjusts a rate of change for the grayscale of the output image to be higher in the high grayscale range than that in the low grayscale range. By this adjustment, the grayscale value of the output image corresponding to the grayscale value of one pixel in the input image, which was changed from the first value into the second value, may be kept as the second value or readjusted into a new third value.

Here, the operation S150 may be variously achieved in different viewpoints. For example, let a grayscale value ranging from 0 to a predetermined reference value of A in an input image of 8 bits be the low grayscale range, and a grayscale value ranging from the reference value of A to 255 be the high grayscale range. The rate of change for the grayscale value of the output image corresponding to the grayscale value of the input image to be lower than the default value gradually becomes higher as the grayscale value of the input image increases from 0 toward A within the low grayscale range, and gradually becomes lower as the grayscale value of the input image increases from A toward 255 within the high grayscale range.

At operation S160 the display apparatus displays the output image with the adjusted grayscale value. In general, it is easy for a human to distinguish a difference in a dark area, but difficult to distinguish a difference in a bright area. The display apparatus makes the change in the output brightness be relatively rapid within the high grayscale range, so that pixels can have sharper contrast in the high grayscale range. On the other hand, the display apparatus makes the change in the output brightness be relatively gentle within the low grayscale range, thereby preventing the average output brightness from increasing due to the adjustment within the high grayscale range.

Thus, the foregoing adjustment causes a displayed image to have relatively vivid contrast even though the effective average brightness level of the displayed image is lowered to prevent the glare of the display apparatus.

Below, detailed processing operations of the display apparatus will be described.

Figure 4:
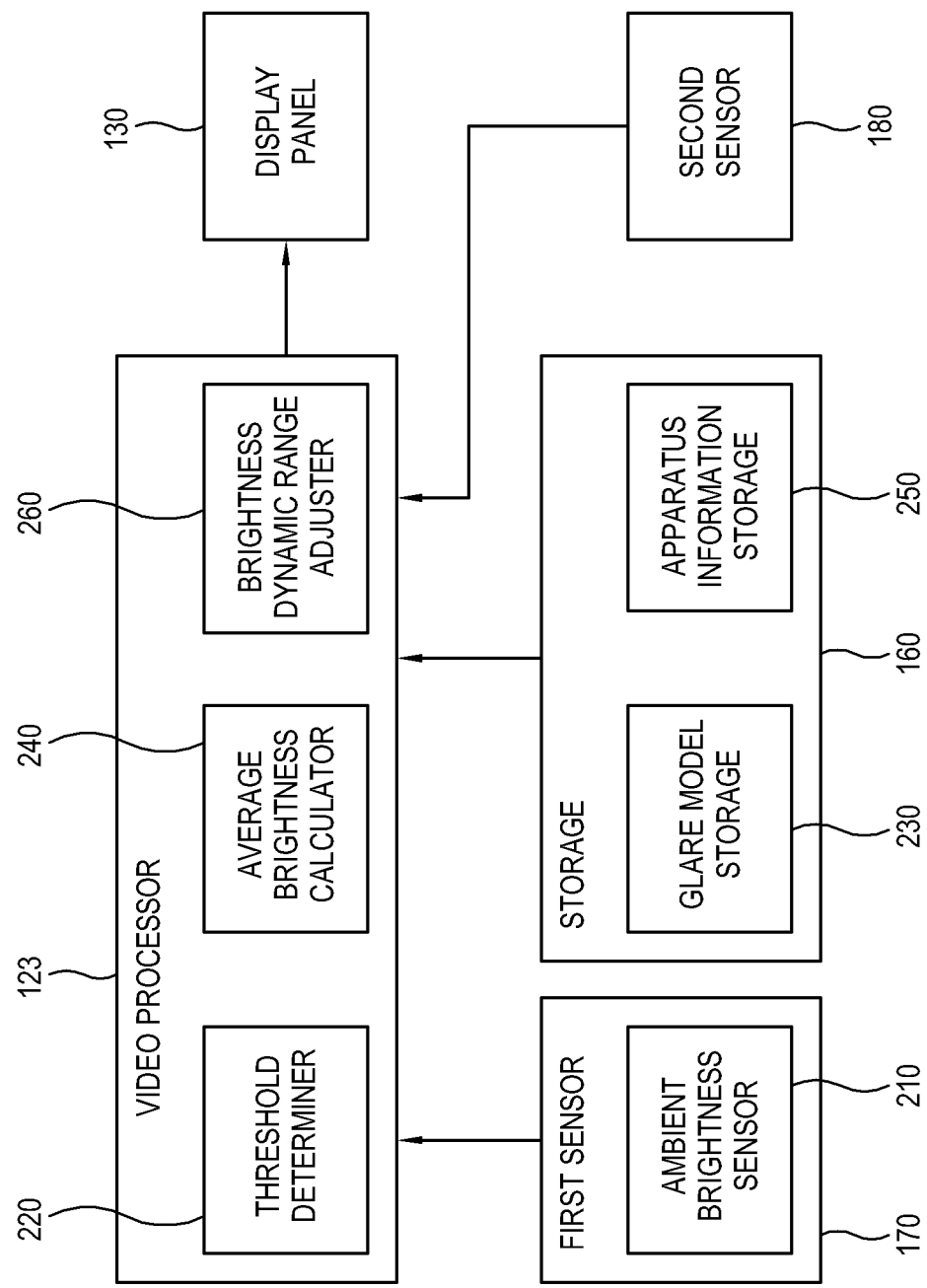
FIG. 4 is a block diagram illustrating example processing an image in the display apparatus according to an example embodiment.

FIG. 4 is a block diagram illustrating an example of processing an image in the display apparatus according to an example embodiment;

As illustrated in FIG. 4, the display apparatus includes an ambient brightness sensor 210, a threshold determiner (e.g., including threshold determining circuitry and/or program elements) 220, a glare model storage 230, an average brightness calculator (e.g., including calculation circuitry) 240, an apparatus information storage 250, a brightness dynamic range adjuster (e.g., including brightness dynamic range adjusting circuitry and/or program elements) 260, and a display panel 270. These elements are divided according to functions. In practice, these elements may be achieved by hardware, software, combination of the hardware and the software, etc., and may be replaced by the elements of the display apparatus according to the foregoing example embodiment.

For example, among the elements of the foregoing display apparatus described with reference to FIG. 2, the video processor 123 may include the threshold determiner 220, the average brightness calculator 240 and the brightness dynamic range adjuster 160, and the storage 160 may include the glare model storage 230 and the apparatus information storage 250.

The ambient brightness sensor 210 is achieved by a sensor for sensing the ambient brightness of the display apparatus, and thus the first sensor 170 includes the ambient brightness sensor 210. If the ambient brightness sensor 210 calculates the ambient brightness based on sensing results from the first sensor 170, the ambient brightness sensor 210 may be included in the video processor 123. The ambient brightness sensor 210 transmits a measured value of the brightness to the threshold determiner 220.

The threshold determiner 220 determines the second threshold based on the data of the glare model storage 230. Here, the second threshold refers to an upper limit to the effective average brightness level of the output image to be decreased by the glare occurrence. To solve the problem of the glare, the effective average brightness level of the output image has to be lower than the second threshold. In other words, the second threshold refers to the upper limit of L to make $(L/E) \leq Th1$ by reducing a glare level to be lower than the first threshold as described above.

That is, the second threshold determined in the threshold determiner 220 refers to a value of how far the effective average brightness level of the output image will be decreased, and the display apparatus decreases the effective average brightness level of the output image down to the second threshold or below when the glare occurs. The threshold determiner 220 determines the second threshold based on data from the ambient brightness sensor 210, data from the glare model storage 230, data from the average brightness calculator 240, etc.

The glare model storage 230 stores information about recognition of the glare in accordance with conditions for determining the glare. As the conditions for determining the glare, there are ambient brightness, an average brightness level of the display panel, a view distance from a user, the size of the display panel, a pixel pitch of the display panel, etc. Here, the pixel pitch refers to a distance between two pixels adjacent to each other. The display panel having a relatively narrow pixel pitch shows sharper image than the display panel having a relatively wide pixel pitch. Therefore, a user noticeably recognizes a contour artifact in an output image displayed on the display panel having a relatively narrow pixel pitch. This will be described later.

The glare model storage 230 stores glare model information for determining how far the threshold determiner 220 will lower the second threshold, e.g., the effective average brightness level of the output image, but the glare model information is not necessarily stored in the glare model storage 230. For example, the glare model information may be not stored in the glare model storage 230, but obtained in real time by separate elements and transmitted to the threshold determiner 220. For example, information about the view distance from a user, or the like may be sensed by the second sensor 180 such as a camera, an ultrasonic sensor, etc., and information about the pixel pitch may be obtained from a separate element such as the apparatus information storage 250.

The glare model storage 230 may include an algorithm for calculating the glare recognition level from these conditions, or may include detailed numerical values of the glare recognition levels corresponding to these conditions in the form of a lookup table. For example, if the glare recognition level exceeds the first threshold specified as mentioned above, it may be determined that the glare occurs with regard to the currently displayed image.

There are many ways of calculating a glare recognition level Br based on conditions for determining the glare. For example, the glare recognition level Br may be calculated based on the following expression.

$$Br \propto \log [(L_s)^a (W_s)^b / (L_b)^c] \qquad \text{[Expression 1]}$$

Where, $L_s$ is an effective average brightness level of the display panel 270 recognized by a user, $L_b$ is ambient brightness, and $W_s$ is a relative size of the display panel 270 in accordance with view distances from the user. $W_s$ is in proportion to the area of the display panel 270 and inverse proportion to the square of the view distance. In the foregoing expression, a, b and c are constants determined based on experimentally obtained data. The glare recognition level Br increases as the display panel 270 becomes brighter, the view distance becomes shorter, the display panel 270 becomes bigger and the ambient environment becomes darker.

The average brightness calculator 240 analyzes the input image, and calculates $L_s$ based on the following expression.

$$L_s = \text{MAX}[I_{hvs}(x,y) | 0 \le x \le W, \; 0 \le y \le H]$$

$$I_{hvs} = n(I * W_{hvs}) \qquad \text{[Expression 2]}$$

Where, I refers to an output image, and I(x,y) is a brightness value of when a pixel (x,y) of an input image is displayed on the display panel 270. Further, '*' is a symbol of convolution, W is the number of width pixels of the input image, H is the number of height pixels of the input image, n is an arbitrary constant for normalization, and $W_{hvs}$ is a matrix having the same size as the input image. That is, $W_{hvs}$ refers to a percentage of brightness recognized by a user in accordance with the user's eye line to the output image. In general, $W_{hvs}(x,y)$ increases as (x,y) gets closer a user's gaze upon an image, but decreases as (x,y) gets away from the user's gaze upon the image. The user's gaze on the image may be experimentally determined, but generally regarded as the center of the image.

Therefore, $I_{hvs}(x,y)$ refers to the brightness that a user feels at the point of (x,y) when the user gazes at the output image, and $L_s$ refers to the maximum brightness that a user feels when the user views the output image.

The effective average brightness level of the image recognized by a user is not actually the same as the effective average brightness level of the image displayed on the display panel 270, but may vary depending on distribution of the high grayscale range within the image. This will be described in detail later.

The apparatus information storage 250 includes a pixel pitch between the pixels of the display panel 270, the size of the display panel 270, and information about brightness characteristics such as the maximum brightness, etc.

The brightness dynamic range adjuster 260 determines whether the glare occurs or not based on determination results of the foregoing elements, and adjusts the tone mapping curve. The brightness dynamic range adjuster 260 adjusts the grayscale value of each pixel of the input image in accordance with the adjusted tone mapping curve to thereby convert the grayscale value of the input image into the grayscale value of the output image, so that the output image can be displayed on the display panel 270 in accordance with the converted grayscale value.

Below, an example, in which the effective average brightness level of the image recognized by a user is varied depending on the distribution of the high grayscale range in the image, will be described.

Figure 5:
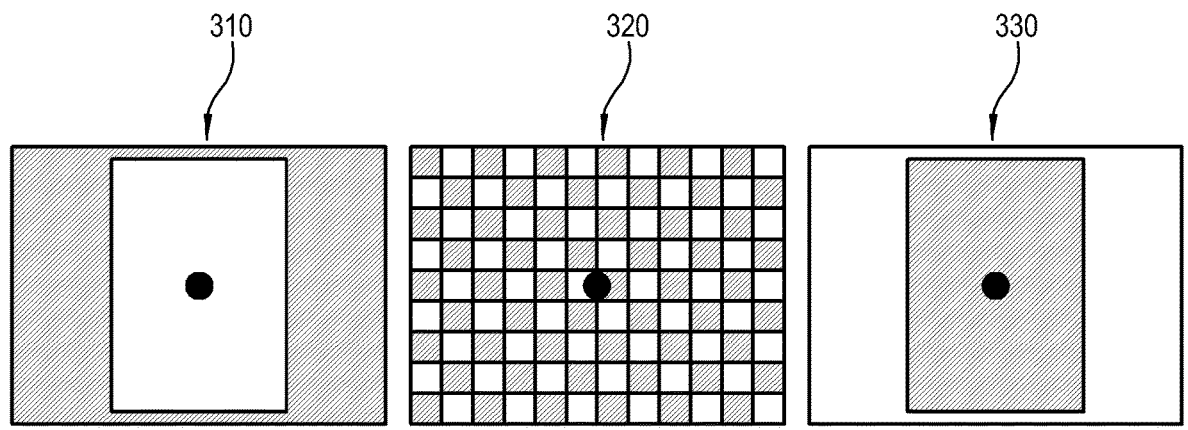
FIG. 5 is a diagram illustrating an example of comparison in brightness distribution among three images displayed on the display apparatus according to an example embodiment.

FIG. 5 is a diagram illustrating an example of comparison in brightness distribution among three images 310, 320, 330 displayed on the display apparatus according to an example embodiment.

As illustrated in FIG. 5, the display apparatus displays three images 310, 320, 330 different in the brightness distribution. Here, three images 310, 320, 330 have the same ratio of a white high grayscale range to a black or hatched low grayscale range, and thus have the same effective average brightness level while being displayed on the display panel. However, a user feels different effective average brightness levels from the images 310, 320 and 330 while gazing at a circle in each center of the images 310, 320 and 330.

The three images 310, 320 and 330 have the same ratio of the high grayscale range to the low grayscale range, but are different in the distribution of the low and high grayscale ranges. In the first image 310, the high grayscale range has a relatively high percentage within a predetermined range upon which a user's gaze is fixed. In the second image 320, the high grayscale range has approximately the same percentage as the low grayscale range within the corresponding range. In the third image 330, the low grayscale range has a relatively high percentage within the corresponding range. Therefore, a user actually feels the highest effective average brightness level in the first image 310, the next highest effective average brightness level in the second image 320, and the lowest effective average brightness level in the third image 330.

For example, suppose that the actual average brightness level is of 800 nit when each of the images 310, 320 and 330 is displayed on the display panel. However, a user may recognize an average brightness level of 600 nit in the first image 310, an average brightness level of 400 nit in the second image 320, and an average brightness level of 300 nit in the third image 330. If a threshold for determining whether the glare occurs or not is set to 500 nit, the display apparatus determines that the glare occurs when displaying the first image 310 of which the average brightness level recognized by a user is higher than the threshold, but determines that no glare occurs when displaying the second image 320 or the third image 330.

Like this, the display apparatus determines that the glare occurs if a predetermined area including a point at which a user gazes, e.g. an area corresponding to the high grayscale range within a center region of an image is larger by a predetermined percentage than an area corresponding to the low grayscale range, under conditions that the actual effective average brightness level of the image displayed on the display panel is higher than a specific value. Of course, this method is just one example, and various techniques and method may be applied to determine whether the glare occurs.

Below, a method of distinguishing between the low grayscale range and the high grayscale range within a certain video frame will be described.

Figure 6:
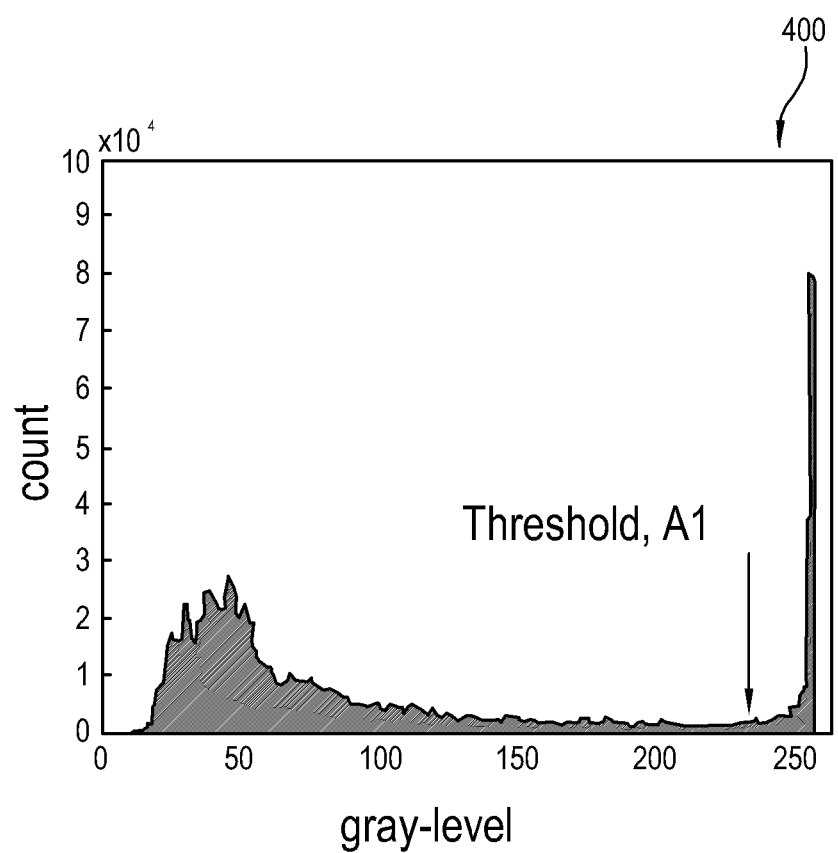
FIG. 6 is a histogram illustrating an example gray level in a certain video frame displayed on the display apparatus according to an example embodiment.

FIG. 6 is a histogram 400 illustrating an example of gray level in a certain video frame displayed on the display apparatus according to an example embodiment.

As illustrated in FIG. 6, the histogram 400 is drawn to show distribution of the gray levels pixels have within the video frame, from the video frame of the input image. In the histogram 400, the abscissa indicates a gray level from 0 to 255, and the ordinate indicates the number of pixels. That is, the histogram 400 shows how many pixels within the video frame have a certain gray level. With this histogram 400, it is easy to determine what gray level is the most within the video frame.

Based on the histogram 400, the display apparatus determines a gray level A1 as a criterion for distinguishing between the low grayscale range and the high grayscale range within the video frame. If the gray level A1 is determined, pixels having gray levels lower than the gray level A1 are regarded as the low grayscale range, and pixels having gray levels higher than the grayscale value A1 are regarded as the high grayscale range.

An algorithm for determining the gray level A1 includes many methods. As one of these methods, there is 'Otsu Thresholding Algorithm'. This algorithm has been proposed by Otsu, in which if a histogram of a certain image shows a bimodal curve having two sharp peaks, a valley between the two peaks is determined as a criterion for determining between the two peaks. If a certain set is divided into two categories, this algorithm classifies parts relatively close together into one category. Since this algorithm is publicly known, detailed descriptions thereof will be omitted.

The distribution of the gray levels is varied depending on the video frame, and thus the gray level A1, e.g., the criterion is not fixed but changed in accordance with the video frames. That is, it is varied depending on the video frames what region belongs to the low grayscale range and what region belongs to the high grayscale range within the video frame.

Below, a method of adjusting a tone mapping curve if the display apparatus determines that the glare occurs will be described.

Figure 7:
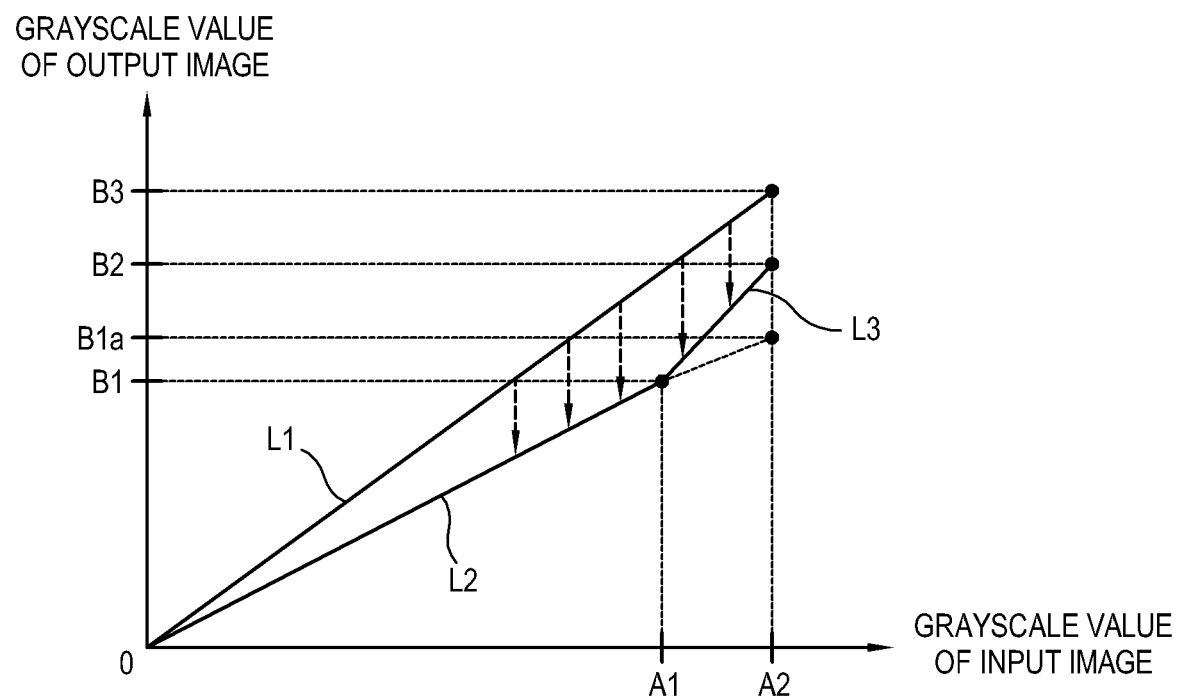
FIG. 7 is a graph illustrating an example tone mapping curve for performing a tone mapping method in the display apparatus according to an example embodiment.

FIG. 7 is a graph illustrating an example tone mapping curve for performing a tone mapping method in the display apparatus according to an example embodiment.

As illustrated in FIG. 7, the display apparatus has tone mapping settings for converting the grayscale value of the input image into the grayscale value of the output image. These settings may be given in the form of a curve or a straight line on the tone mapping graph.

In this graph, the abscissa indicates grayscale values of pixels within the video frame of the input image, in which the grayscale values range from 0 to 255. On the other hand, the ordinate indicates grayscale values of the output image to be displayed on the display panel, in which the grayscale values are given in units of nit. The maximum grayscale value of the output image, e.g., B3 cannot exceed the actual maximum brightness of the display panel. For reference, the reason why the values on the abscissa range from 0 to 255 is because an 8-bit image is input. Thus, such a range of the grayscale value on the abscissa may vary depending on what bit of an image is input. For example, if the input image is of 10 bit, the grayscale value ranges from 0 to 1023.

If no glare occurs, the display apparatus adjusts the grayscale value of the input image into the grayscale value of the output image based on the straight line L1 by way of an example. In this example embodiment, the tone mapping curve is given in the form of a straight line, but not limited thereto. Alternatively, the tone mapping curve may be given in a curve. As necessary, the display apparatus may be designed to convert the grayscale values of the input images into the grayscale values of the output images based on a look-up table (LUT) for mapping the respective values. The display apparatus looks for a value on the ordinate corresponding to a grayscale value of one pixel in the video frame based on the straight line L1, and thus obtains the grayscale value of the output image. In this example embodiment, the tone mapping settings are given in the form of the straight line, and therefore the grayscale value of the input image linearly corresponds to the grayscale value of the output image.

On the other hand, if the glare occurs, it is impossible to perform the tone mapping based on the straight line L1. If the display apparatus simply lowers the maximum grayscale value of the output image and performs the tone mapping based on a new straight line having a lower slope than the straight line L1, the average grayscale value of the output image is relatively decreased, thereby solving the problem of the glare. However, if the grayscale value of the input image is linearly mapped to the grayscale value of the output image in the state that the maximum grayscale value of the output image is decreased, the output image generally becomes dark and the contrast is decreased.

Accordingly, the display apparatus adjusts the tone mapping curve as follows.

The display apparatus calculates the grayscale value A1 to be used as a criterion for distinguishing between the low grayscale range and the high grayscale range within the video frame. In the video frame, the low grayscale range includes pixels having the grayscale values between 0 and A1, and the high grayscale range includes pixels having the grayscale values between A1 and A2. A2 refers to the maximum grayscale value in the video frame and does not exceed '255'. As described above, A1 may be calculated by the Otsu Thresholding Algorithm.

With this, the straight line L2 is created having the lower slope than the straight line L1. Here, the slope of the straight line L2 may be determined based on experiments in manufacturing the display apparatus, so that the effective average brightness level of the output image tone-mapped by the straight line L2 can be lower than the foregoing second threshold of the threshold determiner 220. With regard to the low grayscale range, the display apparatus performs the tone mapping based on the straight line L2.

In general, it is easy for a human to distinguish between light and shade in the low grayscale range, but difficult to distinguish between light and shade in the high grayscale range. Therefore, the display apparatus maps the maximum brightness corresponding to A2 to not B1a based on the straight line L2 but B2 higher than B1a, and maps A1 to B1 based on the straight line L2. Then, a straight line L3 of connecting (A1,B1) and (A2,B2) is drawn. With regard to the high grayscale range, the display apparatus performs the tone mapping based on the straight line L3.

Further, B2 is determined based on how far the glare of the output image is serious. Since the glare of the output image is in proportion to the area of the high grayscale range within the video frame, B2 is determined to be in inverse proportion to the area of the high grayscale range. That is, the display apparatus decreases B2 as the high grayscale range has a higher percentage within the video frame but increases B2 as the high grayscale range has a lower percentage within the video frame, when determining B2 between B1a and B3.

In addition, the pixel pitch of the display panel may be additionally taken into account when the display apparatus determines B2. For example, B2 is determined in proportion to the size of pixel pitch. The pixel pitch limits the maximum value of B2. B2 becomes greater when the pixel pitch increases, but becomes smaller as the pixel pitch decreases. The higher the slope of the straight line L3 is, the more noticeable the contour artifact is as a kind of image distortion caused during the tone mapping process. However, the contour artifact to be recognized by a user is reduced as the pixel pitch of the display panel increases, and therefore the display apparatus controls B2 in accordance with the pixel pitch, thereby improving image quality.

In comparison between the straight line L2 for the tone mapping in the low grayscale range and the straight line L3 for the tone mapping in the high grayscale range, the slope of the straight line L2 is relatively gentle, but the slope of the straight line L3 is relatively steep. For this reason, the brightness of the output image is relatively smoothly varied in the low grayscale range as the grayscale value of the input image increases, but the brightness of the output image is relatively rapidly varied in the high grayscale range as the grayscale value of the input image increases.

Since the effective average brightness level of the video frame is lowered as compared with that of no glare, the display apparatus prevents the glare from occurring. Besides, a rate of change for the grayscale of the output image is relatively high in the high grayscale range of the input image, and therefore the display apparatus minimizes and/or reduces contrast decrease caused when the effective average brightness level is lowered.

Here, the increase in the effective average brightness level caused by the relatively high rate of change for the grayscale within the high grayscale range compensates for the decrease caused by the relatively low rate of change for the grayscale within the low grayscale range. Therefore, the effective average brightness level of the output image is not too high to cause the glare even though the slope of the straight line L3 is adjusted to be relatively steep in the high grayscale range.

In the foregoing example embodiment, the tone mapping curve is continuous in the low grayscale range and the high grayscale range. However, the present concept is not limited to this example embodiment, but may be applied to a discontinuous tone mapping curve.

Figure 8:
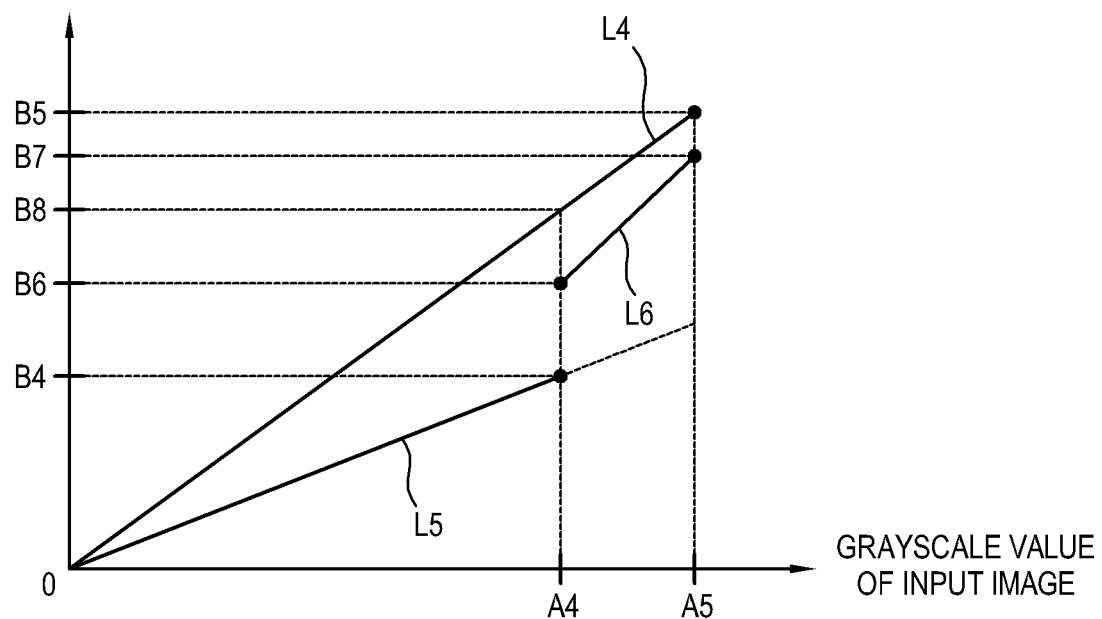
FIG. 8 is a graph illustrating an example tone mapping curve for performing a tone mapping method in a display apparatus according to another example embodiment.

FIG. 8 is a graph illustrating an example tone mapping curve for performing a tone mapping method in a display apparatus according to another example embodiment.

As illustrated in FIG. 8, the display apparatus has tone mapping settings for determining the grayscale value of the output image corresponding to the grayscale value of the input image, and these settings may be represented in a graph. Basic maters of this graph are equivalent to those of FIG. 7, and thus repetitive descriptions will be avoided.

Let the maximum gray level of the input image be A5, and the maximum brightness of the output image be B5. At this time, a tone mapping curve L4 for no glare is drawn to connect the origin and (A5,B5). In this example embodiment, L4 is a straight line, but not limited thereto and may be given in the form of a curve.

If the glare occurs, the tone mapping is performed in a state that the slope of the straight line L4 is lowered, thereby coping with the glare. As the grayscale value A4 is specified as the criterion for distinguishing between the low grayscale range and the high grayscale range within the input image, a grayscale value B4 of the output image and a straight line L5 corresponding to the low grayscale range are determined. Further, B7 is determined in accordance with how far the glare of the output image is serious. This determination method is based on the same principle as that of the foregoing example embodiment.

Here, not a straight line of connecting (A4,B4) and (A5,B7) but a straight line of connecting (A4,B6) and (A5,B7) is determined as a straight line L6. That is, the straight line L5 of the low grayscale range and the straight line L6 corresponding to the high grayscale range are adjusted to be discontinued from each other with respect to A4. Let the brightness corresponding to the grayscale value A4 be B8 based on the straight line L4. In this case, the brightness B6 refers to brightness between B4 and B8. B6 may be determined by various methods. For example, B6 may be determined in inverse proportion to a percentage of the high grayscale range in the input image.

For example, if a percentage of an area occupied by the high grayscale range is lower than a preset value within the input image, the display apparatus makes B6 be relatively high, thereby enhancing the contrast of the whole image. On the other hand, if the percentage of the area occupied by the high grayscale range is higher than the preset value within the input image, the display apparatus makes B6 be relatively low, thereby preventing the glare.

Like this, the display apparatus according to an example embodiment variously adjusts the tone mapping curve, thereby preventing the glare and improving the contrast.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments.

The program command recorded in this storage medium may be specially designed and configured according to the example embodiments, or may be publicly known and available to those skilled in the art of computer software.

Although various example embodiments have been illustrated and described, it will be appreciated by those skilled in the art that changes, modifications, alternative and variations may be made in these example embodiments without departing from the principles and spirit of the disclosure, the scope of which is defined in the appended claims and their equivalents.

What is claimed is:

1. A display apparatus comprising:
a display;
a signal receiver configured to receive an image signal;
a sensor configured to sense ambient brightness; and
a processor configured to:
in response to receiving an input image of the image signal, identify whether a glare level is greater than a threshold, the glare level corresponding to the ambient brightness sensed by the sensor and a brightness of the display, and
in response to identifying that the glare level is greater than the threshold, convert the input image into an output image to be displayed on the display, and decrease an upper limit of a grayscale value of the output image, at least by performing a tone mapping with a tone mapping curve comprising a first slope with respect to grayscale values of pixels in the input image which are not larger than a preset grayscale value, and performing the tone mapping with a tone mapping curve having a second slope to grayscale values of pixels in the input image which are larger than the preset grayscale value, wherein the second slope is higher than the first slope.

2. The display apparatus according to claim 1, wherein the processor is configured to adjust at least one of a first rate of change for the grayscale of the output image to a low grayscale range of the input image or a second rate of change for the grayscale of the output image to a high grayscale range of the input image such that the second rate is larger than the first rate.

3. The display apparatus according to claim 1, wherein the processor is configured to determine the preset grayscale value based on distribution of total grayscale values of the input image.

4. The display apparatus according to claim 1, wherein the processor is configured to adjust the upper limit of the grayscale value of the output image to be in inverse proportion to a percentage of an area occupied by a high grayscale range between the high grayscale range and a low grayscale range of the input image.

5. The display apparatus according to claim 1, wherein the processor is configured to adjust the upper limit of the grayscale value of the output image to be in proportion to a pixel pitch of the display.

6. The display apparatus according to claim 1, wherein the glare level is in proportion to a difference between the ambient brightness and the brightness of the display.

7. The display apparatus according to claim 1, further comprising a second sensor configured to sense a position of a user,
wherein the glare level is in inverse proportion to a distance between the display and a user sensed by the second sensor and in proportion to the size of the display.

8. A non-transitory computer-readable recording medium having stored thereon program code which, when executed by a processor of a display apparatus, causes the display apparatus to perform at least one operation, comprising:
receiving an image signal for an input image;
identifying whether a glare level is greater than a threshold, the glare level corresponding to ambient brightness and brightness of a display of the display apparatus;
in response to identifying that the glare level is greater than the threshold, converting the input image into an output image, and decreasing an upper limit of a grayscale value of the output image, at least by performing a tone mapping with a tone mapping curve having a first slope with respect to grayscale values of pixels in the input image which are not larger than a preset grayscale value, and performing the tone mapping with a tone mapping curve having a second slope to grayscale values of pixels in the input image which are larger than the preset grayscale value, wherein the second slope is higher than the first slope; and
displaying the output image on the display.

9. The non-transitory computer-readable recording medium according to claim 8, wherein the converting the input image into the output image comprises adjusting at least one of a first rate of change for the grayscale of the output image to a low grayscale range of the input image or a second rate of change for the grayscale of the output image to a high grayscale range of the input image such that the second rate is larger than the first rate.

10. The non-transitory computer-readable recording medium according to claim 8, comprising determining the preset grayscale value based on distribution of total grayscale values of the input image.

11. The non-transitory computer-readable recording medium according to claim 8, wherein the converting the input image into the output image comprises adjusting the upper limit of the grayscale value of the output image to be in inverse proportion to a percentage of an area occupied by a high grayscale range between the high grayscale range and a low grayscale range of the input image.

12. The non-transitory computer-readable recording medium according to claim 8, wherein the converting the input image into the output image comprises adjusting the upper limit of the grayscale value of the output image to be in proportion to a pixel pitch of the display.

13. The non-transitory computer-readable recording medium according to claim 8, wherein the glare level is in proportion to difference between the ambient brightness and the brightness of the display.

14. The non-transitory computer-readable recording medium according to claim 8, wherein the glare level is in inverse proportion to a distance between the display and a user and in proportion to the size of the display.

* * * * *